United States Patent [19]

Balph et al.

[11] 4,130,878
[45] Dec. 19, 1978

[54] EXPANDABLE 4 × 8 ARRAY MULTIPLIER

[75] Inventors: Thomas J. Balph; Richard H. Lane, both of Mesa, Ariz.

[73] Assignee: Motorola, Inc., Schaumburg, Ill.

[21] Appl. No.: 892,792

[22] Filed: Apr. 3, 1978

[51] Int. Cl.² .............................................. G06F 7/52
[52] U.S. Cl. .................................................... 364/758
[58] Field of Search ........................................ 364/758

[56] References Cited

U.S. PATENT DOCUMENTS

| 3,670,956 | 6/1972 | Calhoun | 364/758 |
| 3,752,971 | 8/1973 | Calhoun et al. | 364/758 |
| 3,914,589 | 10/1975 | Gaskill, Jr. et al. | 364/758 |

Primary Examiner—David H. Malzahn

Attorney, Agent, or Firm—Marvin A. Glazer

[57] ABSTRACT

An expandable array multiplier is disclosed using an asynchronous, sequential add technique for multiplying two numbers in either straight magnitude or two's complement notation. First and second control terminals are provided for simplifying expansion to larger array sizes. The control terminals can be programmed to select either two's complement or straight magnitude multiplication. For a two's complement multiply, the control terminals are programmed according to the relative position of the particular multiplier within an expanded array such that the proper two's complement correction terms are generated within a particular multipler. A carry-lookahead technique is used to further improve multiplier performance.

13 Claims, 10 Drawing Figures

FIG. 2

|  | MULTIPLICAND | | | | | | | $-X_S 2^7$ | $+X_6 2^6$ | $+X_5 2^5$ | $+X_4 2^4$ | $+X_3 2^3$ | $+X_2 2^2$ | $+X_1 2^1$ | $+X_0 2^0$ |
|---|---|---|---|---|---|---|---|---|---|---|---|---|---|---|---|
|  | MULTIPLIER | | | | | | | | | | | $-Y_S 2^3$ | $+Y_2 2^2$ | $+Y_1 2^1$ | $+Y_0 2^0$ |
| CROSS PRODUCT TERMS | | | | | | | | | $X_S \overline{Y_0}$ | $X_6 Y_0$ | $X_5 Y_0$ | $X_4 Y_0$ | $X_3 Y_0$ | $X_2 Y_0$ | $X_1 Y_0$ | $X_0 Y_0$ |
|  | | | | | | | | $X_S \overline{Y_1}$ | $X_6 Y_1$ | $X_5 Y_1$ | $X_4 Y_1$ | $X_3 Y_1$ | $X_2 Y_1$ | $X_1 Y_1$ | $X_0 Y_1$ |
|  | | | | | | | $X_S \overline{Y_2}$ | $X_6 Y_2$ | $X_5 Y_2$ | $X_4 Y_2$ | $X_3 Y_2$ | $X_2 Y_2$ | $X_1 Y_2$ | $X_0 Y_2$ | |
|  | | | | | | $\overline{Y_S}$ | $X_S \overline{Y_S}$ | $\overline{X_6} Y_S$ | $\overline{X_5} Y_S$ | $\overline{X_4} Y_S$ | $\overline{X_3} Y_S$ | $\overline{X_2} Y_S$ | $\overline{X_1} Y_S$ | $\overline{X_0} Y_S$ | |
|  | | | | | | | | | | | | | | | |
|  | | | | | $-2^{11}$ | | $X_S Y_S'$ | | | | | $X_S$ | | | $Y_S$ | |
|  | | | | | | | $\overline{X_S}$ | | | | | | | | | |

PRODUCT $-Z_{11} 2^{11} + Z_{10} 2^{10} + Z_9 2^9 + Z_8 2^8 + Z_7 2^7 + Z_6 2^6 + Z_5 2^5 + Z_4 2^4 + Z_3 2^3 + Z_2 2^2 + Z_1 2^1 + Z_0 2^0$

FIG. 3

|  | MULTIPLICAND | | | | | | | $-X_S 2^7$ | $+X_6 2^6$ | $+X_5 2^5$ | $+X_4 2^4$ | $+X_3 2^3$ | $+X_2 2^2$ | $+X_1 2^1$ | $+X_0 2^0$ |
|---|---|---|---|---|---|---|---|---|---|---|---|---|---|---|---|
|  | MULTIPLIER | | | | | | | | | | | $-Y_S 2^3$ | $+Y_2 2^2$ | $+Y_1 2^1$ | $+Y_0 2^0$ |
| CROSS PRODUCT TERMS | | | | | $X_S \overline{Y_1} C_2$ | $X_S \overline{Y_0} C_2$ | $X_6 Y_0$ | $X_5 Y_0$ | $X_4 Y_0$ | $X_3 Y_0$ | $X_2 Y_0$ | $X_1 Y_0$ | $X_0 Y_0$ | | |
|  | | | | $X_S \overline{Y_1} \overline{C_2}$ | $X_S \overline{Y_1} C_2$ | $X_S \overline{Y_0} \overline{C_2}$ | $X_6 Y_1$ | $X_5 Y_1$ | $X_4 Y_1$ | $X_3 Y_1$ | $X_2 Y_1$ | $X_1 Y_1$ | $X_0 Y_1$ | | |
|  | | | | $X_S \overline{Y_2} C_2$ | $X_S \overline{Y_2} \overline{C_2}$ | $X_6 Y_2$ | $X_5 Y_2$ | $X_4 Y_2$ | $X_3 Y_2$ | $X_2 Y_2$ | $X_1 Y_2$ | $X_0 Y_2$ | | | |
|  | | $X_S Y_S \overline{C_1} C_2$ | $X_S \overline{Y_S} \overline{C_1} C_2$ | $X_S Y_S' \overline{C_1}$ | $\overline{X_6} Y_S$ | $\overline{X_5} Y_S$ | $\overline{X_4} Y_S$ | $\overline{X_3} Y_S$ | $\overline{X_2} Y_S$ | $\overline{X_1} Y_S$ | $\overline{X_0} Y_S \overline{C_1}$ | | | | |
|  | | $X_S Y_S C_1 C_2$ | $X_S \overline{Y_S} C_1 \overline{C_2}$ | $\overline{X_6} Y_S C_1$ | $\overline{X_5} Y_S C_1$ | $\overline{X_4} Y_S C_1$ | $\overline{X_3} Y_S C_1$ | $\overline{X_2} Y_S C_1$ | $\overline{X_1} Y_S C_1$ | $X_0 Y_S \overline{C_1}$ | | | | | |
|  | | $X_S Y_S' \overline{C_1} \overline{C_2}$ | $\overline{Y_S} C_1 C_2$ | $\overline{X_6} Y_S \overline{C_1}$ | $\overline{X_5} Y_S \overline{C_1}$ | $X_4 Y_S \overline{C_1}$ | $X_3 Y_S \overline{C_1}$ | $X_2 Y_S \overline{C_1}$ | $X_1 Y_S \overline{C_1}$ | $X_0 Y_S \overline{C_1}$ | | | | | |
|  | $-2^{11} C_1 C_2$ | $\overline{X_S} C_1 C_2$ | | | | | | $X_S'$ | | | | $Y_S'$ | | | |

PRODUCT $-S_{11} 2^{11} + S_{10} 2^{10} + S_9 2^9 + S_8 2^8 + S_7 2^7 + S_6 2^6 + S_5 2^5 + S_4 2^4 + S_3 2^3 + S_2 2^2 + S_1 2^1 + S_0 2^0$

EXPANDABLE 4 × 8 ARRAY MULTIPLIER

BACKGROUND OF THE INVENTION

1. Field of the Invention

This invention relates generally to multiplier circuits and more particularly to a high speed, asynchronous, sequential add multiplier.

2. Description of the Prior Art

High speed digital multiplication is often required for real time computer processing for such tasks as digital filtering, signal processing, and fast Fourier transforms. Synchronous iterative add-shift techniques are not well suited for applications in which speed is a critical factor. Therefore, array multipliers have been developed for asynchronously generating the product of two numbers. One such multiplier circuit is discussed by Douglas Geist, "MOS Processor Picks Up Speed With Bipolar Multipliers", *Electronics,* Mar. 31, 1977, pages 113–115.

A desirable feature of a multiplier circuit is the ability to perform multiplication upon numbers represented in various number systems. In some applications the numbers input to the multiplier circuit are represented as absolute values (straight-magnitude form). In other so called sign-magnitude applications, a sign bit is coupled with the magnitude portion of the number to designate positive and negative magnitudes. In still other applications, two's-complement number representation is used to represent both positive and negative numbers. One advantage of two's complement notation is that subtraction of a first number from a second number can be performed by adding the two's complement of the first number to the second number, thereby eliminating the need for a subtractor. As magnitude, sign magnitude, and two's complement number systems are well known in the art, they will not be further described. For a more detailed review of binary number systems, see generally Gear, *Computer Organization and Programming,* McGraw-Hill Book Company, 1969.

Applications may exist in which both straight magnitude and two's complement numbers are to be multiplied by the same multiplier circuit. Prior art array multiplier circuits are not designed so as to allow the multiplier to be programmable, i.e., to be switched between straight magnitude and two's complement operation. Thus, it will be appreciated that an array multiplier which can be selectively controlled to interpret a given plurality of input bits as either a straight magnitude or two's complement number amounts to a significant improvement over the prior art.

Another desirable feature of a multiplier circuit is a provision for expansion of a plurality of such circuts into an array for multiplying numbers with bit lengths which exceed the capacity of a single multiplier circuit. As the standard bit length of computer data words continues to increase, the need for larger multiplier arrays becomes more important. Fabrication of a commercially practical monolithic high speed multiplier circuit is limited, by present integrated circuit technology, to a circuit capable of multiplying two sixteen-bit operands.

Prior art multiplier circuits are known which allow for interconnection to like circuits to form an expanded multiplier array. In forming an expanded array, each of the operands is divided into segments, each segment having a bit length equal to the capacity of a single multiplier circuit. When the operands are in two's complement form, the most significant bit (sign bit) of an operand indicates whether the operand is positive or negative. If the operand is negative then correction terms must be generated within the multiplier circuit in order to provide a proper two's complement product. Prior art multiplier circuits include additional input terminals which are used only to receive the two's complement sign bit of each operand. However, these additional input terminals must be hardwired to a logic "0" for those multiplier circuits within the array that do not receive the two's complement sign bit of the operands. These additional input terminals are coupled to adder circuits for adding correction terms in a two's complement multiplication. For those lower order multiplier circuits for which the additional input terminals have been hardwired to a logic "0", the adder circuits used to add the correction terms are idle. Thus, it will be appreciated that a multiplier circuit which may easily be expanded into a large multiplier array and which does not require the addition of extra adder circuits internally for adding correction terms during a two's complement multiplication is a significant improvement over the prior art.

SUMMARY OF THE INVENTION

It is an object of the present invention to provide a multiplier which can be programmed by control inputs to multiply two operands represented in either straight magnitude or two's complement form and generate the corresponding product.

It is also an object of this invention to provide a multiplier which may be easily expanded to form a multiplier array for multiplying two operands represented in straight magnitude or two's complement form.

Another object of this invention is to provide a multiplier which is easily expanded into a two's complement multiplier array in which each multiplier can be programmed by control inputs to provide the proper two's complement cross product terms during a two's complement multiplication.

It is a further object of the this invention to provide a multiplier for multiplying two operands represented in straight magnitude or two's complement form and which eliminates the necessity for additional adders in order to add the two's complement correction terms during a two's complement multiplication.

Briefly described the present invention relates to a multiplier which generates the product of first and second binary data words represented in either straight magnitude or two's complement notation. First and second control terminals receive first and second control signals which are used to indicate whether the first and second binary data words are in straight magnitude or two's complement form. The first and second binary data words are received by a plurality of logic gates which respond to the first and second control signals and provide a plurality of cross product signals. The cross product signals are then summed by adders in accordance with the binary weighting of each of the cross product signals, in order to form the product of the first and second binary data words. The first and second control terminals allow for the interconnection of a plurality of such multipliers to form an expanded two's complement multiplier array whereby the relative position of each of the multipliers within the expanded array is indicated by the control signals received by the first and second control terminals.

BRIEF DESCRIPTION OF THE DRAWINGS

FIG. 2 is a table of two's complement cross product terms that are generated from the multiplication of an 8-bit multiplicand and a 4-bit multiplier.

FIG. 3 is a table of two's complement cross product terms modified by a first and a second control signal according to the invention.

DESCRIPTION OF THE PREFERRED EMBODIMENT

Figure 1:
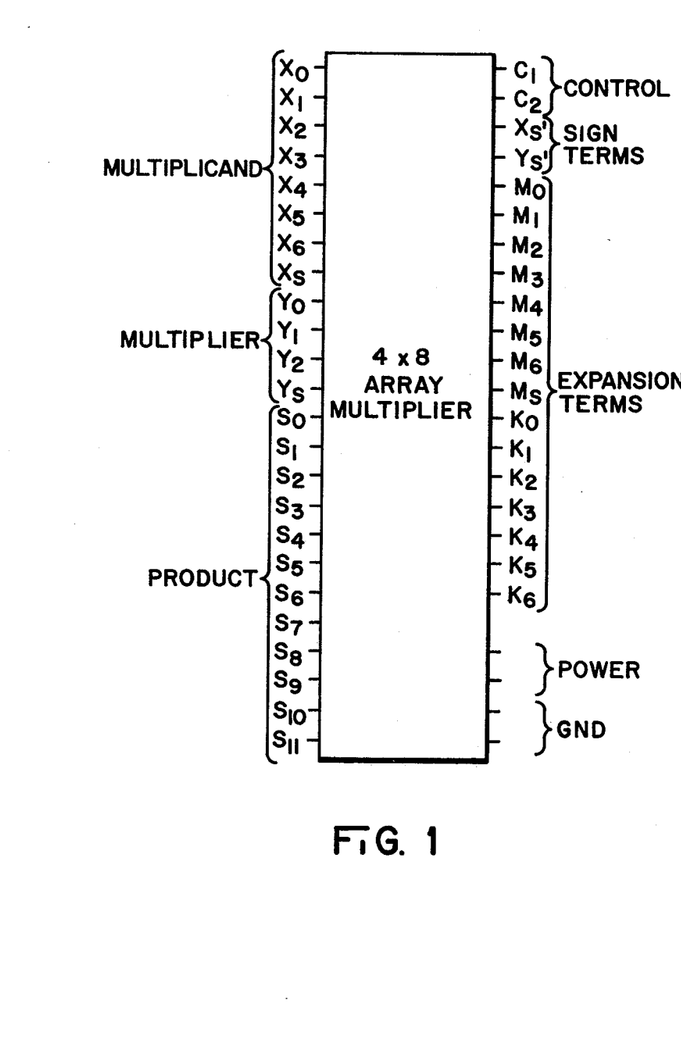
FIG. 1 is a block diagram of a 4 × 8 expandable array multiplier circuit showing input and output terminals for connection to the circuit.

In FIG. 1 the input and output terminals coupled to a 4 × 8 array multiplier are shown according to a preferred embodiment of the invention. The eight-bit multiplicand operand is presented to the multiplier via input terminals $X_s$-$X_0$ where $X_s$ corresponds to the most significant bit. The four-bit multiplier operand is presented to the multiplier via input terminals $Y_s$-$Y_0$ where $Y_s$ corresponds to the most significant bit of the multiplier. A 12-bit product is output via output terminals $S_{11}$-$S_0$ where $S_{11}$ corresponds to the most signficant bit of the product. First and second control inputs, $C_1$ and $C_2$ are used to program the multiplier as will be described later. Input terminals $M_s$-$M_0$ and $K_6$-$K_0$ are expansion inputs which are used when a multiplier is interconnected within a larger array of such multipliers. Inputs $X_s'$ and $Y_s'$ are used as additional expansion inputs and are also used when the multiplier is used to perform two's complement multiplication as will be explained later.

The algorithm used by the preferred embodiment of the invention to generate the product is a "sequential add" which does not require any shifting of partial products. A brief derivation of the algorithm used to perform the two's complement multiplication will now be described. A two's complement multiplicand, X, having N-bits and a two's complement multiplier, Y, having M-bits can be expressed as:

$$X = -X_s 2^{N-1} + \sum_{k=0}^{N-2} X_k 2^k \quad (1)$$

$$Y = -Y_s 2^{M-1} + \sum_{i=0}^{M-2} Y_i 2^i \quad (2)$$

The two's complement product, Z, of these two numbers is then:

$$Z = X_s Y_s 2^{M+N-2} + X_s 2^{N-1}(-\sum_{i=0}^{M-2} Y_i 2^i) + \quad (3)$$
$$+ Y_s 2^{M-1}(-\sum_{k=0}^{N-2} X_k 2^k) + \sum_{k=0}^{N-2} \sum_{i=0}^{M-2} X_k Y_i 2^{k+i}$$

Using simple two's complement arithmetic, it can be shown that:

$$-\sum_{i=0}^{M-2} Y_i 2^i = -2^{M-1} + [(\sum_{i=0}^{M-2} \overline{Y_i} 2^i) + 1] \quad (4)$$

$$-\sum_{k=0}^{N-2} X_k 2^k = -2^{N-1} + [(\sum_{k=0}^{N-2} \overline{X_k} 2^k) + 1] \quad (5)$$

Upon substitution of (4) and (5) into (3), the product Z is the following:

$$Z = X_s Y_s 2^{M+N-2} - X_s 2^{M+N-2} + X_s 2^{N-1}[(\sum_{i=0}^{M-2} \overline{Y_i} 2^i) + 1] \quad (6)$$
$$- Y_s 2^{M+N-2} + Y_s 2^{M-1}[(\sum_{k=0}^{N-2} \overline{X_k} 2^k) + 1]$$
$$+ \sum_{k=0}^{N-2} \sum_{i=0}^{M-2} X_k Y_i 2^{k+i}$$

Making use of the following equalities, $$-X_s 2^{M+N-2} = -2^{M+N-2} + \overline{X_s} 2^{M+N-2} \quad (7)$$

$$-Y_s 2^{M+N-2} = -2^{M+N-2} + \overline{Y_s} 2^{M+N-2} \quad (8)$$

and upon further simplification of (6), the product Z can be expressed as the following:

$$Z = -2^{M+N-1} + (X_s Y_s + \overline{X_s} + \overline{Y_s})2^{M+N-2} + \quad (9)$$
$$X_s 2^{N-1}[(\sum_{i=0}^{M-2} \overline{Y_i} 2^i) + 1] + Y_s 2^{M-1}[(\sum_{k=0}^{N-2} \overline{X_k} 2^k) + 1] +$$
$$\sum_{k=0}^{N-2} \sum_{i=0}^{M-2} X_k Y_i 2^{k+i}$$

From equation (9), it can be seen that four types of basic cross product terms appear in the algorithm. First there are cross product terms which include only the sign bit of the multiplicand, $X_s$, or only the sign bit of the multiplier, $Y_s$, or both $X_s$ and $Y_s$; this first group of terms corresponds to $(X_s Y_s + \overline{X_s} + \overline{Y_s})2^{M+N-2}$. Secondly, there are terms which include the sign bit of the multiplicand, $X_s$, multiplied by complemented Y bits, corresponding to $$X_s 2^{N-1}[(\sum_{i=0}^{M-2} \overline{Y_i} 2^i) + 1].$$

Third, there are terms which include the sign bit of the multiplier, $Y_s$, multiplied by complemented X bits, corresponding to $$Y_s 2^{M-1}[(\sum_{k=0}^{N-2} \overline{X_k} 2^k) + 1].$$

Finally, there are those terms which include neither the sign bit of the multiplicand nor the sign bit of the multiplier. This fourth group of terms is characteristic of a straight magnitude multiplication.

As an example of how the algorithm is applied, FIG. 2 shows a table of cross product terms generated for a two's complement multiply of an 8-bit multiplicand and a 4-bit multiplier. The cross product terms are grouped in columns corresponding to their respective binary weights. The product Z is generated by adding the cross product terms in each corresponding column and adding the carries produced in each column to the next most significant column.

Figure 4:
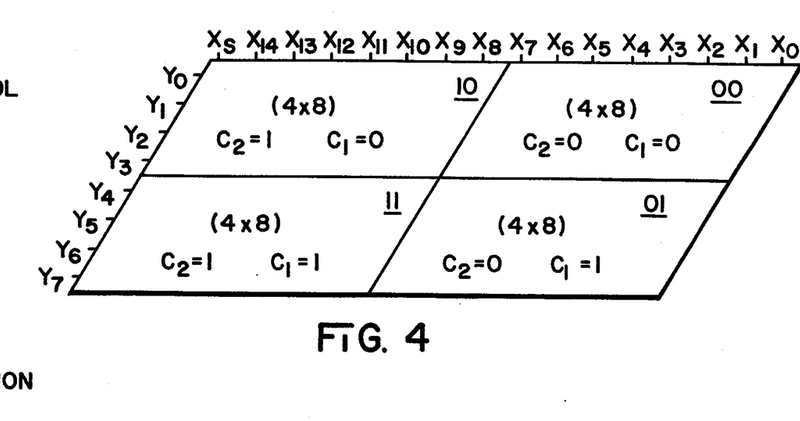
FIG. 4 is a block diagram of an 8 × 16 expanded array multiplier including four multipliers of the type illustrated in FIG. 1.

As another example of how the algorithm is applied, assume that it is desired to multiply a 16-bit multiplicand, X, by an 8-bit multiplier, Y. Further assume that the multiplication will be performed by an array of 4-bit by 8-bit multipliers as is shown in FIG. 4. The four quadrants of the expanded array are identified as quadrant 00, quadrant 10, quadrant 01, and quadrant 11. Quadrant 00 does not receive the sign bit from either the multiplicand X or the multiplier Y. Therefore, the multiplication performed by quadrant 00 can be expressed as follows:

$$\sum_{k=0}^{7}\sum_{i=0}^{3} X_k Y_i 2^{k+i}$$

Quadrant 10 receives the sign bit $X_s$ of the multiplicand but does not receive the sign bit $Y_s$ of the multiplier. Thus, multiplication performed by quadrant 10 can be expressed as:

$$\sum_{K=8}^{14}\sum_{i=0}^{3} X_k Y_i 2^{k+i} + X_s 2^{15}[(\sum_{i=0}^{3} \overline{Y_i} 2^i) + 1]$$

Quadrant 01 receives the sign bit of the multiplier $Y_s$, but does not receive the sign bit of the multiplicand. Therefore the multiplication performed by quadrant 01 can be expressed as follows:

$$\sum_{k=0}^{7}\sum_{i=4}^{6} X_k Y_i 2^{k+i} + Y_s 2^7[(\sum_{k=0}^{7} \overline{X_k} 2^k) + 1]$$

Finally, quadrant 11 receive the sign bit $X_s$ and also the sign bit $Y_s$. Therefore the multiplication performed by quadrant 11 can be expressed as follows:

$$-2^{23} + (X_s Y_s + \overline{X}_s + \overline{Y}_s)\cdot 2^{22}$$

$$+ X_s 2^{15}[(\sum_{i=4}^{6} \overline{Y_i} 2^i) + 1]$$

$$+ Y_s 2^7[(\sum_{k=8}^{14} \overline{X_k} 2^k) + 1] + \sum_{k=8}^{14}\sum_{i=4}^{6} X_k Y_i 2^{k+i}$$

Thus, each of the quadrants of the expanded multiplier array involves one or more of the four basic cross product terms referred to above, as determined by the relative position of each quadrant within the expanded array.

Figure 6:
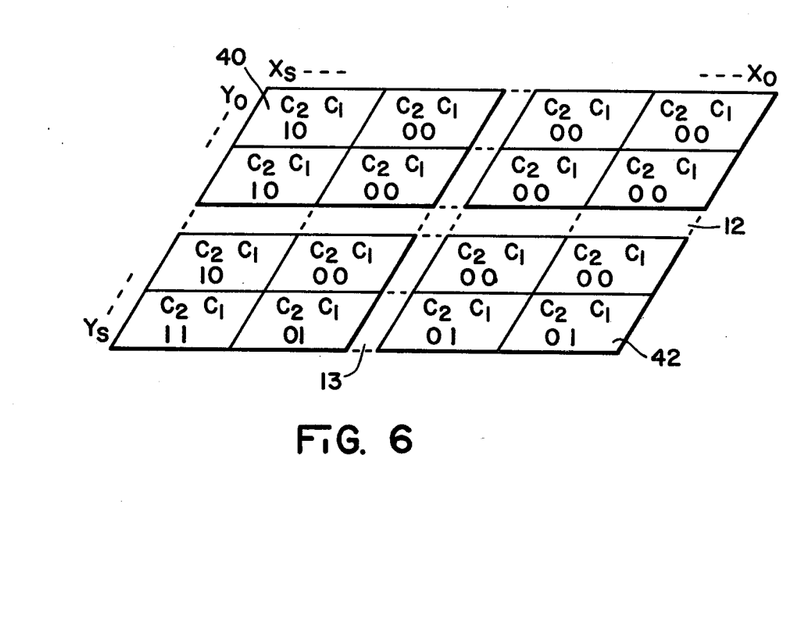
FIG. 6 is a block diagram of an expanded multiplier array which illustrates the programming of the first and second control inputs for an indeterminately large two's complement multiplier array.

It will now be apparent to those skilled in the art that an expanded two's complement multiplier array of any size can be formed by using the four quadrants described in FIG. 4. For example, FIG. 6 shows an expanded two's complement multiplier array which can be used to multiply operands having any desired bit length. The multiplier array consists only of the four types of multiplier quadrants already described with reference to FIG. 4. Regions 12 and 13 in FIG. 6 are used to indicate that the number of rows and columns of multiplier quadrants can be expanded to suit any desired multiplicand and multiplier bit lengths.

It will now be shown that the basic algorithm can be modified with the addition of two control lines to yield a single 4 by 8 multiplier which can be programmed to perform the function of any of the four quadrants discussed with reference to FIG. 4. The control lines have the following relationship to the four quadrants:

| $C_2$ | $C_1$ | Quadrant |
|---|---|---|
| 0 | 0 | 00 |
| 0 | 1 | 01 |
| 1 | 0 | 10 |
| 1 | 1 | 11 |

After modification, the algorithm for obtaining the product Z is the following:

$$Z = (C_1 \cdot C_2)(-2^{M+N-1} + [X_s Y_s + \overline{X}_s + \overline{Y}_s]2^{M+N-2}) +$$

$$Y_s 2^{M-1}(C_1[\sum_{k=0}^{N-2} \overline{X_k} 2^k] + \overline{C}_1[\sum_{k=0}^{N-2} X_k \cdot 2^k]) +$$

$$X_s 2^{N-1}(C_2[\sum_{i=0}^{M-2} \overline{Y_i} 2^i] + \overline{C}_2[\sum_{i=0}^{M-2} Y_i 2^i]) +$$

$$Y_s' 2^{M-1} + X_s' 2^{N-1} + \overline{C}_1 \cdot \overline{C}_2 (X_s Y_s) 2^{M+N-2} +$$

$$\sum_{k=0}^{N-2}\sum_{i=0}^{M-2} X_k Y_i 2^{k+i}$$

where the symbol "·" denotes the logical AND function, and the symbol "+" denotes addition. Applying this modified algorithm to a 4 by 8 multiplication results in the table of cross product terms shown in FIG. 3. From FIG. 3 it will be seen that for the condition in which control inputs $C_1$ and $C_2$ are both "0", the cross product terms reduce to a straight magnitude multiplication of a 4-bit and an 8-bit operand. It will also be seen that when control inputs $C_1$ and $C_2$ are both "1" then the cross product terms are identical to those shown in FIG. 2 for a two's complement 4 by 8 multiplication. By programming control inputs $C_1$ and $C_2$, the 4 × 8 multiplier can perform the function of any of the four quadrants shown in FIG. 4. Thus, the basic 4 × 8 multiplier can be easily expanded to form a multiplier array of any desired size.

Figure 5:
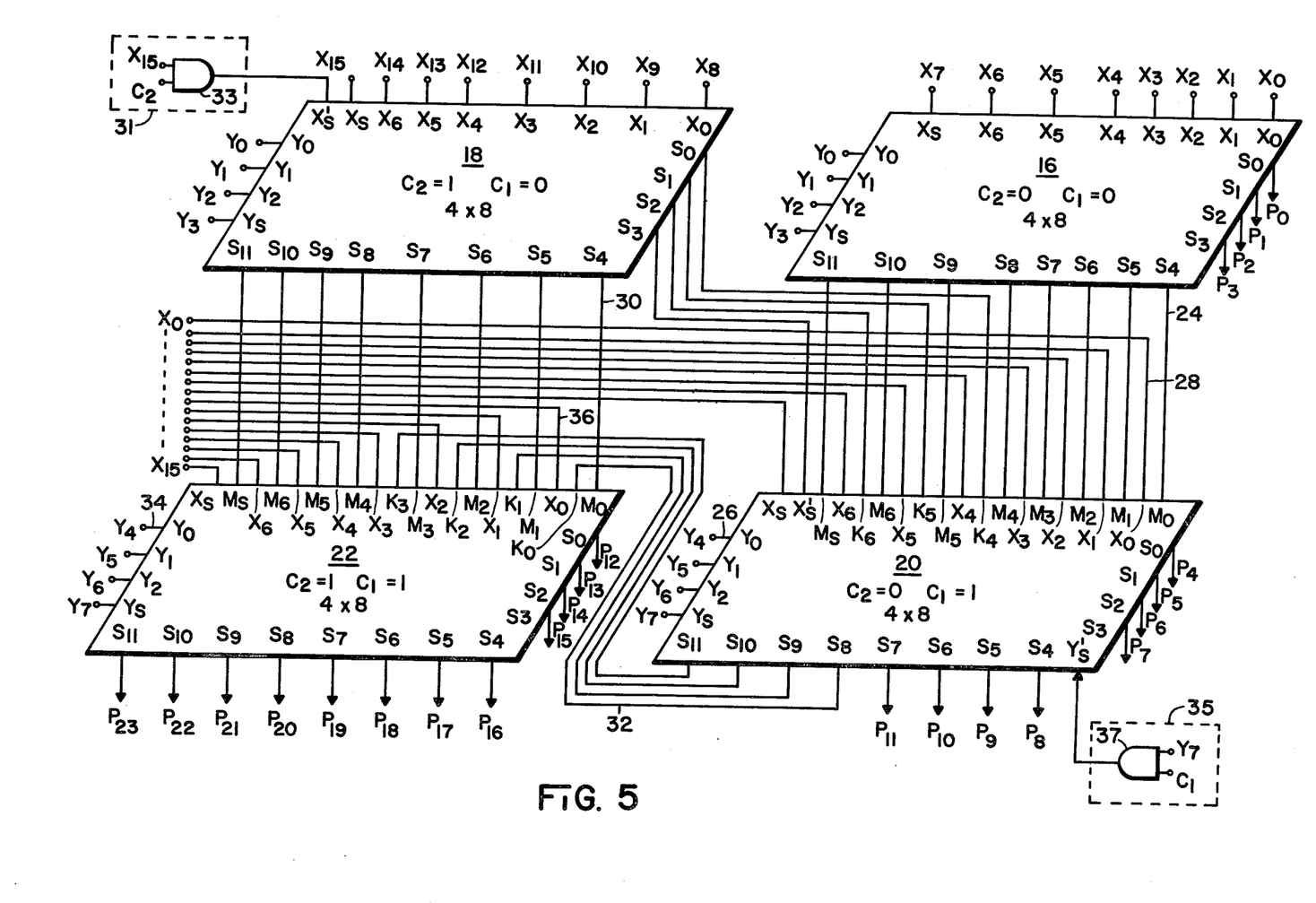
FIG. 5 is a more detailed block diagram of the expanded array shown in FIG. 4 and shows the interconnections between the individual 4 × 8 multipliers.

In FIG. 5 the 8 by 16 two's complement multiplier array of FIG. 4 is shown in greater detail. Multipliers 16, 18, 20, and 22 are 4 by 8 multipliers according to the preferred embodiment of the invention. Multiplier 16 is programmed such that control inputs $C_1$ and $C_2$ are each at logical "0" such that multiplier 16 corresponds to quadrant 00. Multiplier 16 receives the least significant 8 bits ($X_7$-$X_0$) of the multiplicand and the four least significant bits ($Y_3$-$Y_0$) of the multiplier. A 12-bit product is output from multiplier 16 on output terminals $S_{11}$-$S_0$. Output bits $S_3$-$S_0$ are the four least significant product bits of the final multiplication product. However, output bits $S_{11}$-$S_4$ from multiplier 16 must be added with output bits from multiplier 18 and with further cross product terms formed within multiplier 20 before final product bits are generated for the $2^{11}$ through $2^4$ bit positions. For example, output bit $S_4$ from multiplier 16 is coupled by conductor 24 to the $M_0$ expansion input of multiplier 20. Within multiplier 20, the input signal $Y_4$ on conductor 26 and the input signal $X_0$ on conductor 28 are logically gated to form the signal $X_0Y_4$. This signal is then added to the $M_0$ input on conductor 24 to produce the final $P_4$ product bit. Similarly, in order to form the final product bit $P_{12}$ from multiplier 22, output $S_4$ from multiplier 18 is coupled via conductor 30 to the $M_0$ expansion input of multiplier 22, and output $S_8$ from multiplier 20 is coupled via conductor 32 to the $K_0$ expansion input of multiplier 22. Signal $Y_4$ and signal $X_8$ are also coupled to multiplier 22 via conductors 34 and 36, respectively. The signals $X_8$ and $Y_4$ are gated within multiplier 22 to form the signal $X_8Y_4$ which is added to the two signals received by the $M_0$ and $K_0$ expansion inputs to form the final product bit $P_{12}$.

Since multiplier 16 receives only the lower order bits of the multiplicand and the multiplier, the expansion inputs M and K (not shown) are unused and must be forced to a logic "0" input level. Also the $X_s'$ and $Y_s'$ inputs (not shown) for multiplier 16 are unused and must also be forced to a logic "0" input level. Similarly, for multipliers 18, 20 and 22, all unused inputs are forced to a logic "0" input level.

For multiplier 18, input signal $X_{15}$ is coupled to the $X_s$ input. Similarly, for multiplier 20, the $Y_7$ input signal is coupled to the $Y_s$ input. The two's complement multiplication algorithm already discussed requires that input signals $X_{15}$ and $Y_7$ be added to the $2^{15}$ and $2^7$ binary weighted positions respectively. The $X_s'$ and $Y_s'$ inputs may be used for this purpose. The $X_{15}$ input signal could be coupled directly to the $X_s'$ input for multiplier 18. However, as shown in FIG. 5, the preferred embodiment uses external block 31 including AND gate 33 to couple the $X_{15}$ input signal to the $X_s'$ input. For two's complement multiplication, control signal $C_2$ is a logic "1" level, so input signal $X_{15}$ is transmitted by gate 33 to the $X_s'$ input. Similarly, external block 35 including AND gate 37 is used to couple the $X_7$ input signal to the $Y_s'$ input of multiplier 20. Again for two's complement multiplication, control signal $C_1$ is a logical "1" level.

The $X_s'$ and $Y_s'$ inputs may be used as additional expansion inputs as well. Referring briefly to FIG. 3, the $X_s'$ input is added to the cross product terms in the column corresponding to $2^7$ binary weighting. Similarly, the $Y_s'$ input is added to the cross product terms in the column corresponding to $2^3$ binary weighting. Thus, $X_s'$ may be used to supplement the $M_s$ expansion input, and $Y_s'$ may be used to supplement the $M_3$ and $K_3$ expansion inputs. Referring again to FIG. 5, the $X_s'$ input of multiplier 20 is used to receive the $S_3$ sum output from multiplier 18, and expansion input $M_s$ of multiplier 20 is used to receive the $S_{11}$ sum output from multiplier 16 in order to form the $P_{11}$ product output bit corresponding to the $2^{11}$ binary-weighted position. For multiplier 18, the $Y_s'$ input (not shown) is not used and is therefore coupled to a logic "0" input level. Similarly, for multiplier 22, $X_s'$ and $Y_s'$ inputs (not shown) are not used and are coupled to a logic "0" input level.

In order to convert the two's complement multiplier array shown in FIG. 5 to a straight magnitude multiplier array, only control signals $C_1$ and $C_2$ need be modified. The control inputs $C_1$ and $C_2$ for multipliers 18, 20 and 22 are all set to logic "0" such that these multipliers now perform the same function as multiplier 16. It is also necessary to uncouple input signal $X_{15}$ from input $X_s'$ in multiplier 18, and to uncouple input signal $Y_7$ from input $Y_s'$ in multiplier 20. For straight magnitude multiplication, the $X_s'$ input terminal for multiplier 18 and the $Y_s'$ input terminal for multiplier 20 must be coupled to an input "0" logic level. In the preferred embodiment shown in FIG. 5, a logic "0" level will be input to the X's input for multiplier 18 by block 31 because the logic "0" level of control signal $C_2$ forces the output of gate 33 to a logic "0" level. Similarly, block 35 causes a logic "0" level to be input to the $Y_s'$ input of multiplier 20 because the logic "0" level of control signal $C_1$ forces the output of gate 37 to a logic "0" level. Moreover, programmable transitions between two's complement and straight magnitude operation can be simplified by coupling the $C_2$ terminals of multiplier 18, multiplier 22, and block 31 and the $C_1$ terminals of multiplier 20, multiplier 22, and block 35 all to a common control line which is a logic "1" level to select two's complement operation and a logic "0" level to select straight magnitude operation.

Figure 7:
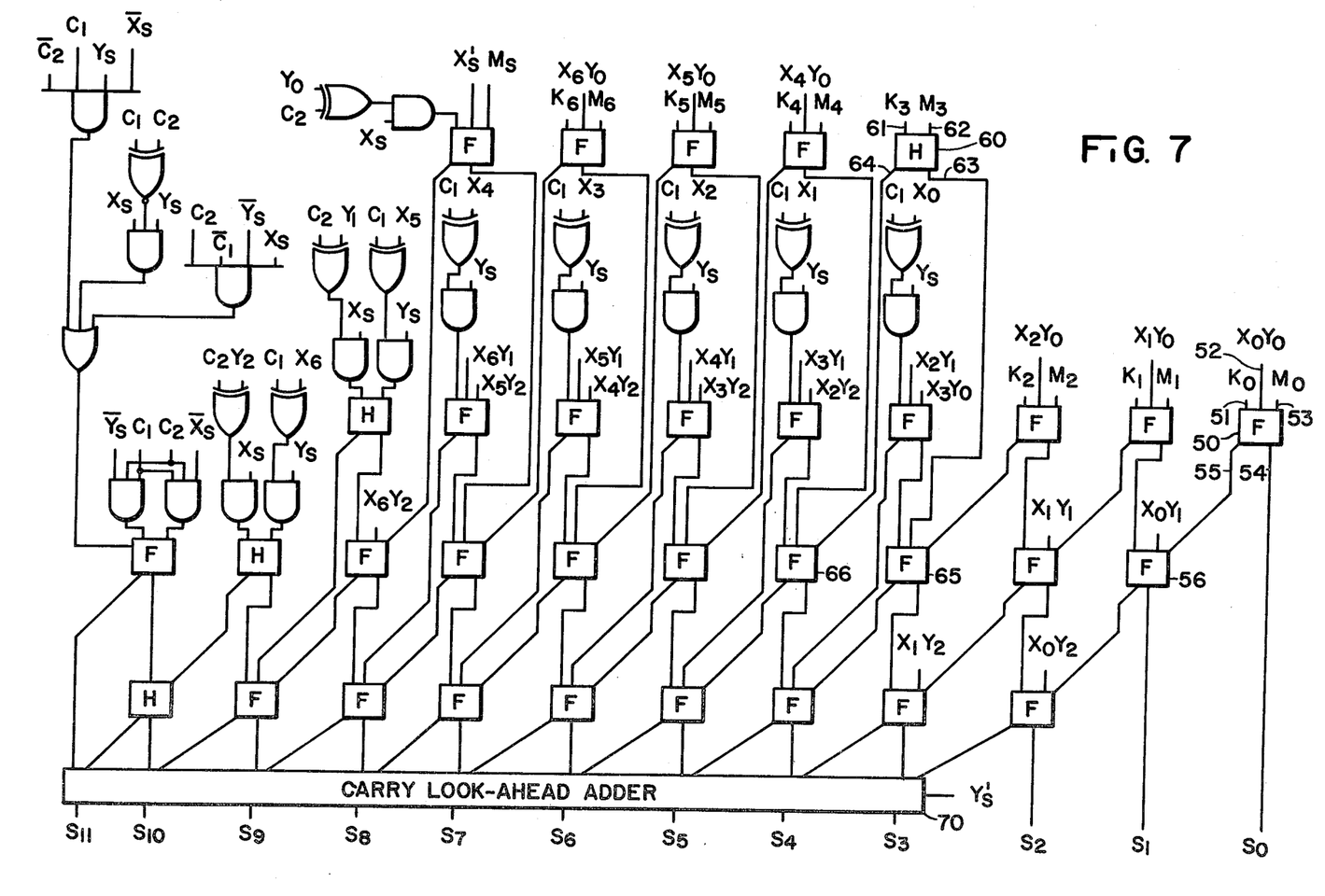
FIG. 7 is a block diagram of a 4 × 8 multiplier according to the preferred embodiment of the invention including gating means, adder blocks, and a carry lookahead block.

In FIG. 7 a block diagram of a 4 × 8 multiplier is shown according to the preferred embodiment of the invention. As is shown in FIG. 7 the multiplier consists of a plurality of gating elements, full and half adder blocks, and a carry lookahead adder block. Adder block 50 is a conventional full adder having three input lines, 51, 52 and 53, and two output lines, 54 and 55. Input lines 51 and 53 are used to receive the expansion input signals $K_0$ and $M_0$ respectively. Input line 52 receives the cross product signal $X_0Y_0$. Adder block 50 adds the signals $K_0$, $X_0Y_0$, and $M_0$ in common binary fashion and generates a binary sum output on line 54 and a binary carry output on line 55. Line 54 is coupled to the $S_0$ output terminal which provides the least significant product bit. The carry output generated on line 55 is coupled to full adder block 56 in the next most significant binary weighted position. The remaining full adder blocks in FIG. 7 function in a similar manner.

Half adder block 60 has two input lines 61 and 62 which are used to receive the expansion input signals $K_3$ and $M_3$ respectively. These two input signals are added in binary fashion to produce a sum output on line 63 and a carry output on line 64. The sum output signal on line 63 is coupled to one of the three inputs of full adder block 65 which corresponds to the same binary weighted position as half adder block 60. The carry output signal generated on line 64 is coupled to one of the three inputs of full adder block 66 in the next most significant binary weighted position. The remaining half adder blocks in FIG. 7 function in a similar manner.

Figure 9:
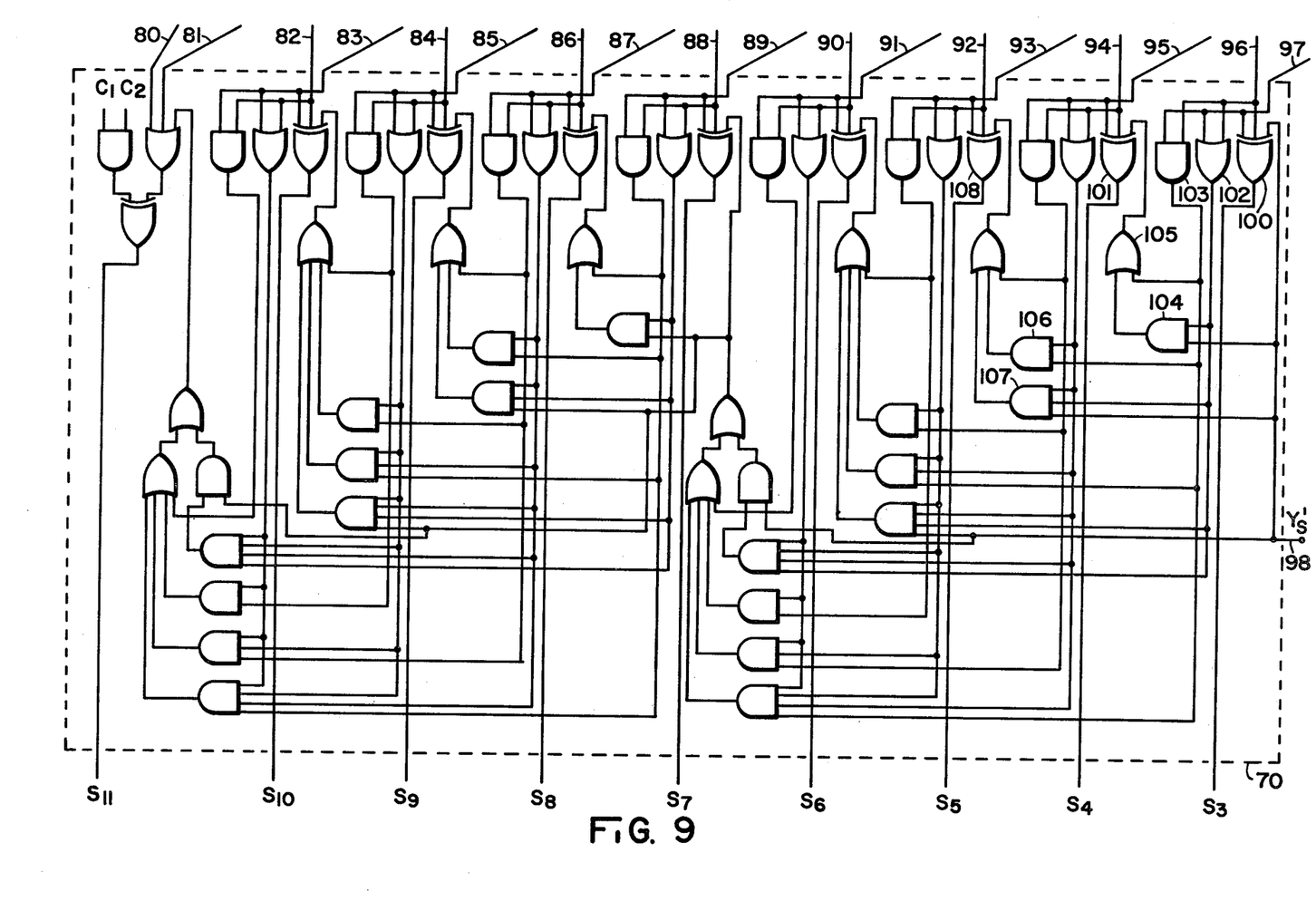
FIG. 9 is a logic diagram corresponding to the carry lookahead block shown in FIGS. 7 and FIG. 8A, B.

Carry lookahead adder block 70 receives a plurality of sum and carry signals from the adder blocks and generates the $S_{11}$-$S_3$ output product bits. The details of carry lookahead adder block 70 are illustrated in FIG. 9. The purpose of carry lookahead adder block 70 is to improve the speed of the multiplier by anticipating and generating the carry signals to the more significant binary weighted positions, thereby eliminating the extra delay time which normally results when carry signals must ripple one bit position at a time toward the most significant bit position. However, it will be obvious to those skilled in the art that additional full and half adder blocks may be substituted for carry lookahead adder block 70 in order to form the final product output bits. Such a substitution would, of course, result in a longer delay time before the product output bits are stabilized.

Figure 8A:
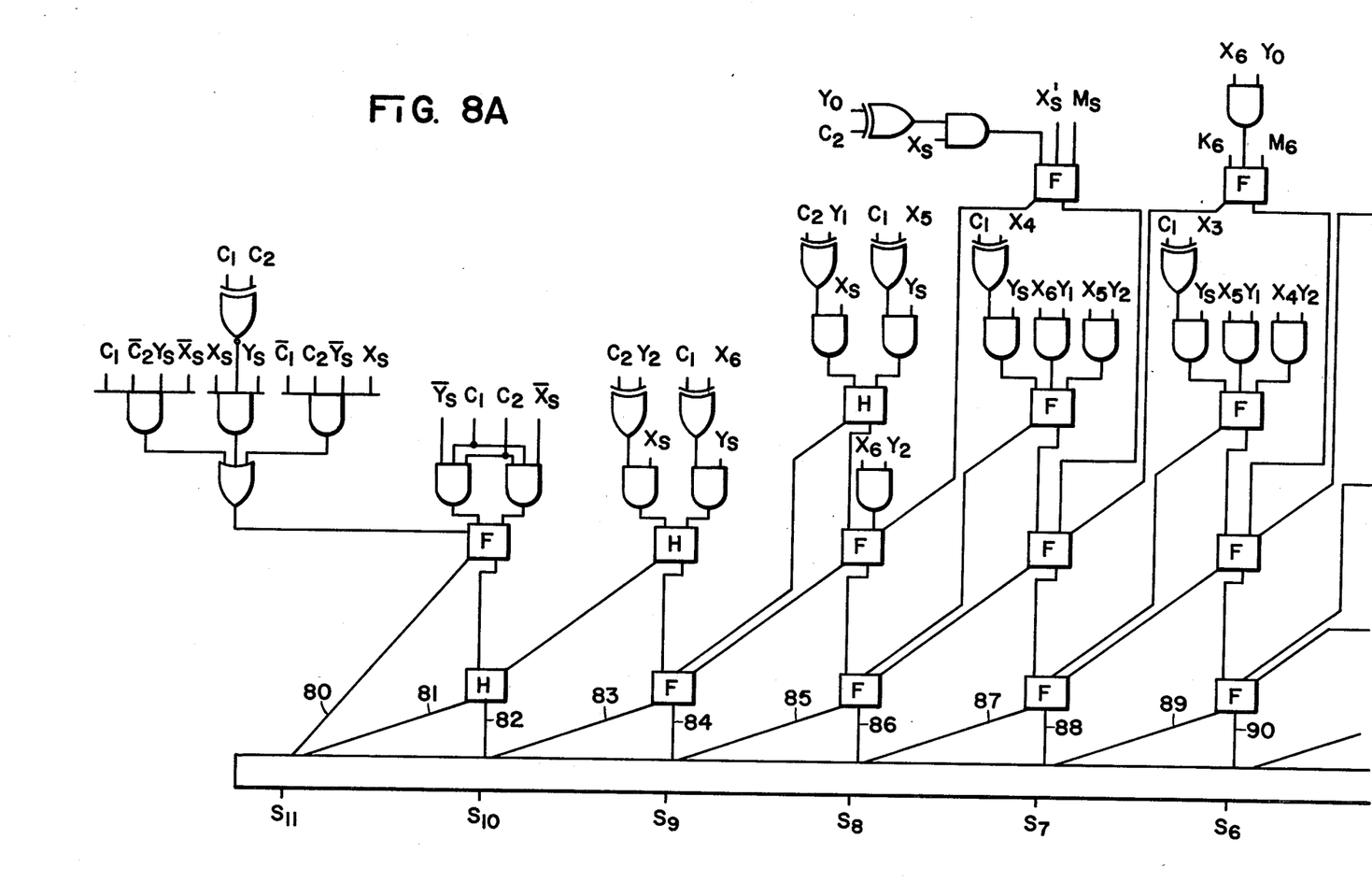
FIGS. 8A, B is a logic diagram showing the gating means in further detail and illustrating the logic contained within full and half adder blocks.
Figure 8B:
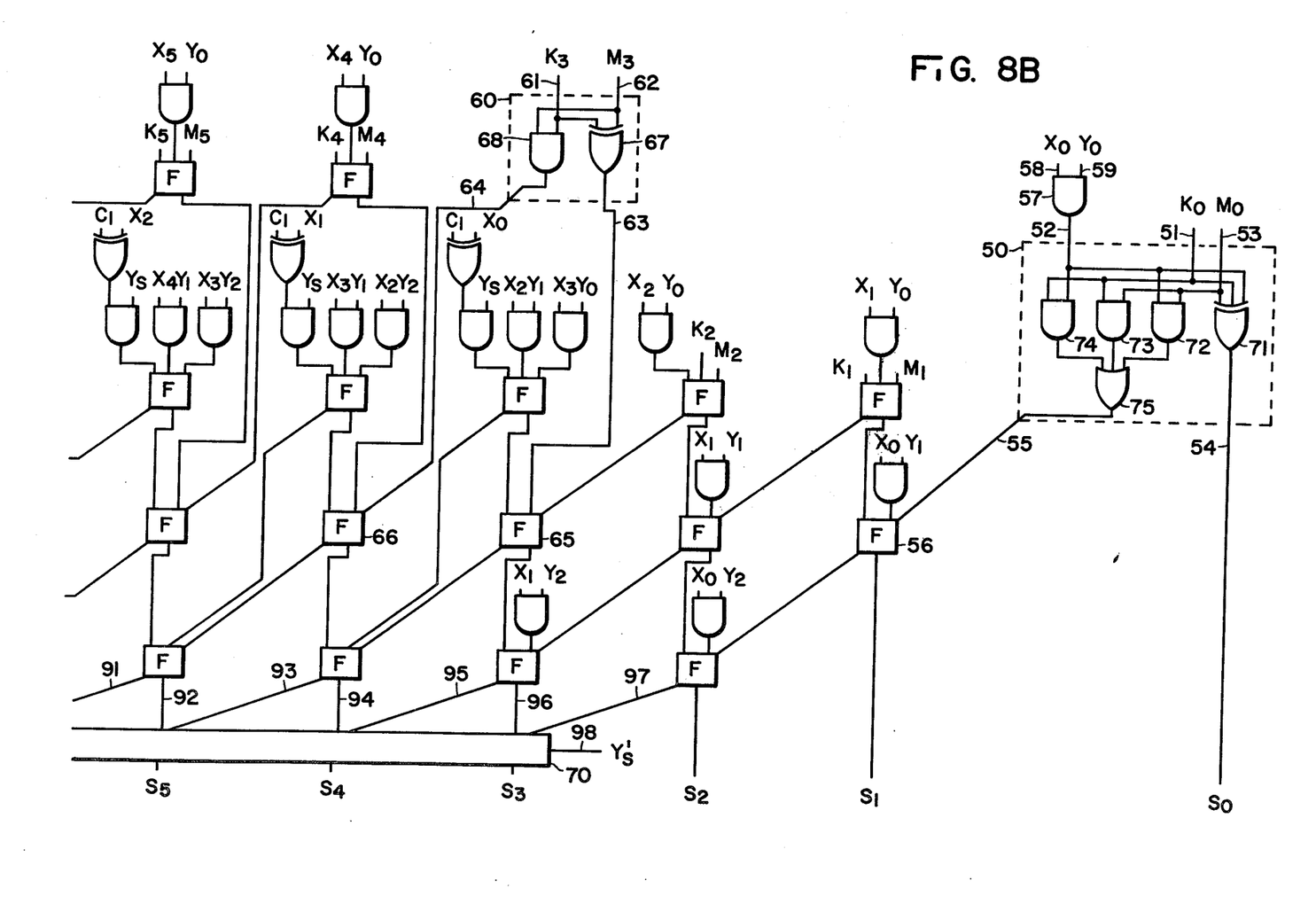

FIGS. 8A, B is a logic diagram illustrating the multiplier in FIG. 7 in greater detail. Full adder block 50 corresponds to the full adder block already described with reference to FIG. 7. Again, lines 51, 52 and 53 provide three inputs to full adder block 50. The input signal coupled to line 52 is generated by a logic AND gate 57. AND gate 57 has two inputs 58 and 59 which are coupled to input signals $X_0$ and $Y_0$ respectively. As is well known in the art the output of logic gate 57 is a logic "1" only when the input signals $X_0$ and $Y_0$ are both logic "1". Each of the input lines 51, 52 and 53 is coupled to an input of EXCLUSIVE-OR gate 71 which adds the three input signals and generates an output sum on line 54. As is well known in the art, the output of gate 71 is a logic "1" if only one or all three of its inputs are at a logic "1", and the output is a "0" if none or only two of its unputs are at a logic "1". Logic gate 72 has its first and second inputs coupled to lines 52 ad 53 respectively, logic gate 73 has its first and second inputs coupled to lines 51 and 53 respectively, and logic gate 74 has its first and second inputs coupled to lines 51 and 52 respectively. Thus, if any two of the input lines 51, 52 and 53 are a logic "1" then the output of at least one of the logic gates 72, 73 and 74 will be at a logic "1". Logic OR gate 75 has its inputs coupled to the outputs of logic gate 72, 73 and 74. Thus, if any two or more of input lines 51, 52, and 53 are at a logic "1" then the output of logic OR gate 75 will generate a logic "1" on carry output line 55.

The details of half adder block 60 referred to in FIG. 7 are also shown in FIGS. 8A, B. Input lines 61 and 62 are coupled to the inputs of EXCLUSIVE-OR gate 67 which provides an output sum on line 63. Input lines 61 and 62 are also coupled to the inputs of logic AND gate 68 which provides a carry output signal on line 64 when the $K_3$ and $M_3$ inputs are both at a logic "1".

In FIG. 9 a logic diagram is shown which corresponds to the carry lookahead adder block 70 in FIG. 7 and in FIGS. 8A, B. The input lines 80–97 in the figure are designated to correspond to the sum and carry signals generated by the adder blocks in FIGS. 8A, B. The carry lookahead adder is conventional and will not be described in detail. The avoidance of the ripple-carry speed slow-down problem mentioned earlier can be demonstrated as follows. Logic gate 100 generates the final produce output bit for $S_3$ corresponding to the $2^3$ binary weighted position; logic gate 101 generates the final product output bit for $S_4$ corresponding to the $2^4$ binary weighted position; and logic gate 108 generates the final product output bit for $S_5$ corresponding to the $2^5$ binary weighted position. Logic gates 102, 103, 104 and 105 generate the carry from the $S_3$ binary weighted position to the $S_4$ binary weighted position. The output of logic gate 105 provides the carry to one of the inputs of adder gate 101. However, the carry generated at the output of gate 105 is not used by the logic which generates the carry from the $S_4$ position to the $S_5$ position. Instead, the outputs generated by logic gates 102 and 103 are coupled to logic gates 106 and 107, respectively, such that the $S_4$ to $S_5$ carry is generated in parallel with the $S_3$ to $S_4$ carry. The parallel carry generation logic used within the carry lookahead adder 70 allows the multiplier in this preferred embodiment to generate the final product in a shorter period of time then would of otherwise result.

While the invention has been described with reference to a 4 × 8 multiplier, the description is for illustrative purposes only and is not to be construed as limiting the scope of the invention. Various modifications and changes may occur to those skilled in the art without departing from the true spirit and scope of the invention as defined by the appended claims.

What is claimed is:

1. A multiplier for generating the product of a first and a second binary data word comprising:
   (a) first and second control terminals for receiving first and second control signals,
   (b) gating means for receiving the first and second binary data words, said gating means being coupled to said first and second control terminals and being responsive to the first and second control signals for generating a selected set of cross product signals, the selected set being determined by the first and second control signals, and
   (c) adder means coupled to said gating means for summing the selected set of cross product signals and providing the product of the first and second binary data words.

2. A multiplier as recited in claim 1 wherein the selected set of cross product signals is alternately representative of straight-magnitude or two's complement cross product signals as determined by the first and second control signals.

3. A multiplier as recited in claim 1 wherein the first control signal is in a first logic state when the first binary data word is of straight-magnitude form and in a second logic state when the first binary data word is of two's complement form, and the second control signal is in a first logic state when the second binary data word is of straight magnitude form and in a second logic state when the second binary data word is of two's complement form.

4. A multiplier as recited in claim 3 wherein said adder means comprises a plurality of adders and carry-lookahead means coupled to said plurality of adders, said carry-lookahead means being for generating a plurality of parallel carry signals and for adding said plurality of parallel carry signals to the selected set such that ripple carry delay is avoided.

5. A multiplier as recited in claim 4 wherein the multiplier is fabricated as a monolithic integrated circuit.

6. A method for generating the product of first and second binary data works, the first and second binary data words being of either straight-magnitude or two's complement form, said method comprising:
   (a) receiving a first plurality of input bits representative of said first binary data word and a second plurality of input bits representative of said second binary data word,
   (b) receiving a first control signal and a second control signal,
   (c) gating said first plurality of input bits, said second plurality of input bits, and said first and second control signals for generating a plurality of cross-product signals, said first and second control signals determining whether said plurality of cross product signals are straight-magnitude or two's complement cross product signals, and
   (d) summing said plurality of cross-product signals to generate a plurality of product output bits representative of the product of said first and second binary data words.

7. A multiplier for generating a segment of the product of a first and a second digital data word and being adapted for use within an expanded array of such multipliers, comprising:
   (a) first and second control terminals for receiving first and second control signals, respectively, for establishing the relative position of the multiplier within the expanded array of such multipliers, (b) gating means for receiving a segment of the first digital data word and for receiving a segment of the second digital data word and for generating a plurality of cross product signals, said gating means being coupled to said first and second control terminals and being responsive to said first and second control signals such that a selected set of cross product signals is enabled as a function of the relative position of the multiplier within the expanded array of such multipliers, and (c) adder means coupled to said gating means for summing said selected set of cross product signals and providing the segment of the product of the first and second digital data words.

8. A multiplier adapted for use within an array of such multipliers, the array of such multipliers being for generating the product of first and second binary data words of two's-complement form, each of said first and second binary data words including a sign bit, said multiplier comprising:

(a) input terminal means for receiving a segment of the first binary data word and for receiving a segment of the second binary data word, (b) a first control terminal for receiving a first binary control signal, the first binary control signal being in a first logical state when the received segment of the first binary data word includes the sign bit of the first binary data word and being in a second logical state otherwise, (c) a second control terminal for receiving a second binary control signal, the second binary control signal being in a first logical state when the received segment of the second binary data word includes the sign bit of the second binary data word and being in a second logical state otherwise, (d) gating means coupled to said input terminal means and responsive to the first and second binary control signals for generating a plurality of cross product signals, and (e) adder means for summing the plurality of cross product signals and for providing a segment of the product of the first and second binary data words.

9. A multiplier for generating either a two's complement or a straight-magnitude product of two binary data words represented in either two's-complement or straight-magnitude form, respectively, comprising:

(a) a first plurality of M input terminals for receiving a first binary data word of M bits of either two's complement or straight-magnitude form, (b) a second plurality of N input terminals for receiving a second binary data word of N bits of either two's complement or straight-magnitude form, (c) control means for receiving control signals, said control signals being for determining whether said first and second binary data words are of two's complement or straight-magnitude form, (d) gating means coupled to said first and second plurality of input terminals and responsive to said control means for generating a plurality of cross product signals having a predetermined binary weighting, and (e) adder means for summing the plurality of cross products signals and providing an M + N bit product of the first and second binary data words.

10. A multiplier as recited in claim 9 wherein said adder means comprises a plurality of adders and carry-lookahead means coupled to said plurality of adders, said carry-lookahead means being for generating a plurality of parallel carry signals and for adding said plurality of parallel carry signals to the plurality of cross product signals such that ripple carry delay is avoided.

11. A multiplier as recited in claim 10 wherein said multiplier is fabricated as a monolithic integrated circuit.

12. A multiplier as recited in claim 9 wherein said adder means further comprises a plurality of expansion input terminals having a predetermined binary weighting for receiving a plurality of expansion input signals and for adding said plurality of expansion input signals to the plurality of cross product signals having a corresponding binary weighting such that said multiplier circuit is adapted for use within an expanded array of such multiplier circuits.

13. A multiplier as recited in claim 12 wherein the multiplier is fabricated as a monolithic integrated circuit.

* * * * *